(12) United States Patent
Banks

(10) Patent No.: US 11,020,691 B2
(45) Date of Patent: Jun. 1, 2021

(54) PIPE CAP FOR DRAIN PIPE OUTLET

(71) Applicant: Douglas W. Banks, Hurdle Mills, NC (US)

(72) Inventor: Douglas W. Banks, Hurdle Mills, NC (US)

(*) Notice: Subject to any disclaimer, the term of this patent is extended or adjusted under 35 U.S.C. 154(b) by 0 days.

(21) Appl. No.: 16/696,785

(22) Filed: Nov. 26, 2019

(65) Prior Publication Data
US 2020/0306668 A1 Oct. 1, 2020

Related U.S. Application Data

(60) Provisional application No. 62/824,760, filed on Mar. 27, 2019.

(51) Int. Cl.
B01D 29/25 (2006.01)
B01D 29/00 (2006.01)

(52) U.S. Cl.
CPC ......... *B01D 29/25* (2013.01); *B01D 29/0004* (2013.01); *B01D 29/0018* (2013.01); *B01D 2201/04* (2013.01)

(58) Field of Classification Search
CPC ............... B01D 29/25; B01D 29/0018; B01D 29/0004; B01D 2201/04; B01D 35/02; B01D 35/14; B01D 35/04; E03F 5/14

USPC .................. 210/459, 435, 439, 460, 449
See application file for complete search history.

(56) References Cited

U.S. PATENT DOCUMENTS

| 5,427,417 | A | * | 6/1995 | Lechuga | E03C 1/12 210/153 |
| 7,143,898 | B1 | * | 12/2006 | Hoaglin | B01D 29/035 210/460 |
| D677,376 | S | * | 3/2013 | Wolff | D23/393 |
| D715,409 | S | * | 10/2014 | Raimondi | D23/259 |
| 2007/0157531 | A1 | * | 7/2007 | Whitaker | A01M 1/24 52/101 |

* cited by examiner

Primary Examiner — Madeline Gonzalez
(74) Attorney, Agent, or Firm — Taylor English Duma LLP

(57) ABSTRACT

An apparatus restricts access to an above-ground conduit outlet extending from an exterior wall of a building. The access restricting apparatus comprises a pipe cap defining a fluid passage open at both a proximal end and a distal end. The proximal end of the pipe cap is adapted to be connected in fluid communication with the conduit outlet. A screen is disposed across the opening at the distal end of the pipe cap for enclosing the interior fluid passage of the pipe cap within an enclosed space defined at least partially by the screen. Apertures in the screen restrict access to the conduit outlet of items larger than the apertures.

9 Claims, 6 Drawing Sheets

PIPE CAP FOR DRAIN PIPE OUTLET

CROSS-REFERENCE TO RELATED APPLICATION

This application claims the benefit of U.S. Provisional Patent Application No. 62/824,760, filed Mar. 27, 2019, which is incorporated by reference herein in its entirety.

BACKGROUND

A pipe cap is described and, more particularly, a pipe cap including a screen for an outlet end of a drain pipe.

Heating and air conditioning systems produce condensate fluid during operation. Drain pipe lines carry the condensate fluid to the exterior of the house or dwelling holding the system. Typically, the drain pipe outlet exits the house through the foundation. The condensate fluid drain pipe outlet is often exposed at a termination point. The exposed end of the drain pipe can be an entry point for bugs or small animals, such as mice and snakes. The drain pipe provides access to the heating and air conditioning system and, ultimately, the rest of the house. Accessing the drain pipe by bugs and small animals is especially rampant during cold weather.

For the foregoing reasons, there is a need for a pipe cap for a drain pipe outlet that will prevent bugs and small animals from passing into the drain pipe via the outlet. Ideally, the pipe cap will allow for relatively quick and easy installation or replacement. When in place over the outlet of a pipe drain, the pipe cap should reliably prevent access to bugs and small animals.

SUMMARY

An apparatus is provided for restricting access to an above-ground conduit outlet extending from an exterior wall of a building. The access restricting apparatus comprises a pipe cap defining a fluid passage open at both a proximal end and a distal end. The proximal end of the pipe cap is adapted to be connected in fluid communication with the conduit outlet. A screen is disposed across the opening at the distal end of the pipe cap for enclosing the interior fluid passage of the pipe cap within an enclosed space defined at least partially by the screen. Apertures in the screen restrict access to the conduit outlet of items larger than the apertures.

In one aspect, the open proximal end connects over the conduit outlet.

In another aspect, the inner diameter of the pipe cap expands from the proximal end to the distal end.

In one embodiment, the fluid passage of the pipe cap is coaxial with the longitudinal axis of the conduit outlet to provide a relatively straight fluid passage therebetween.

BRIEF DESCRIPTION OF THE DRAWINGS

For a more complete understanding of the pipe cap for a drain outlet, reference should now be had to the embodiments shown in the accompanying drawings and described below. In the drawings.

DESCRIPTION

Certain terminology is used herein for convenience only and is not to be taken as a limitation on the invention. For example, words such as "upper," "lower," "left," "right," "horizontal," "vertical," "upward," "transverse" and "downward" merely describe the configuration shown in the FIGS. Indeed, the components may be oriented in any direction and the terminology, therefore, should be understood as encompassing such variations unless specified otherwise.

Figure 1:
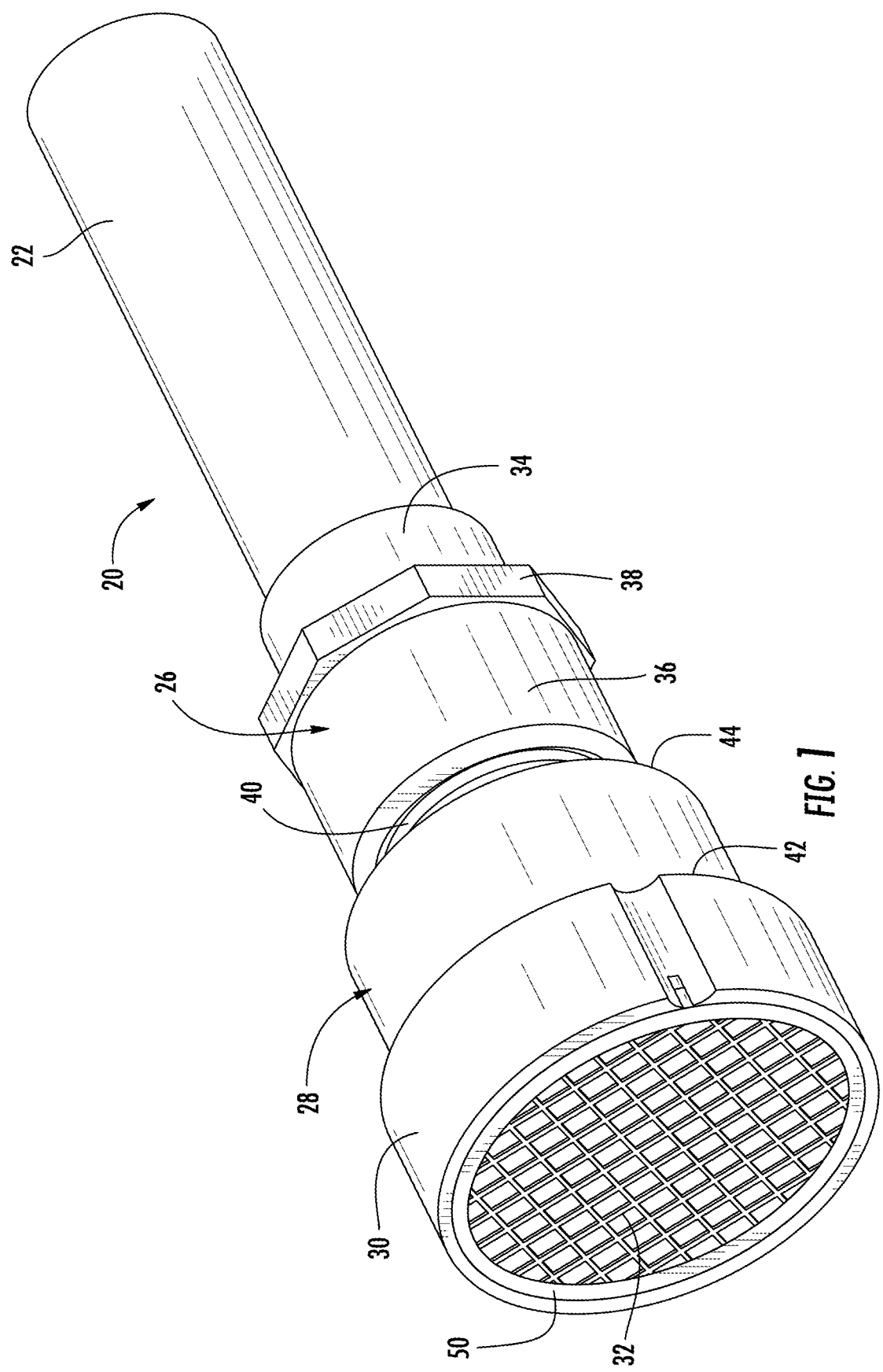
FIG. 1 is a distal end perspective view of an embodiment of a pipe cap assembly for accommodating a pipe drain outlet.
Figure 2:
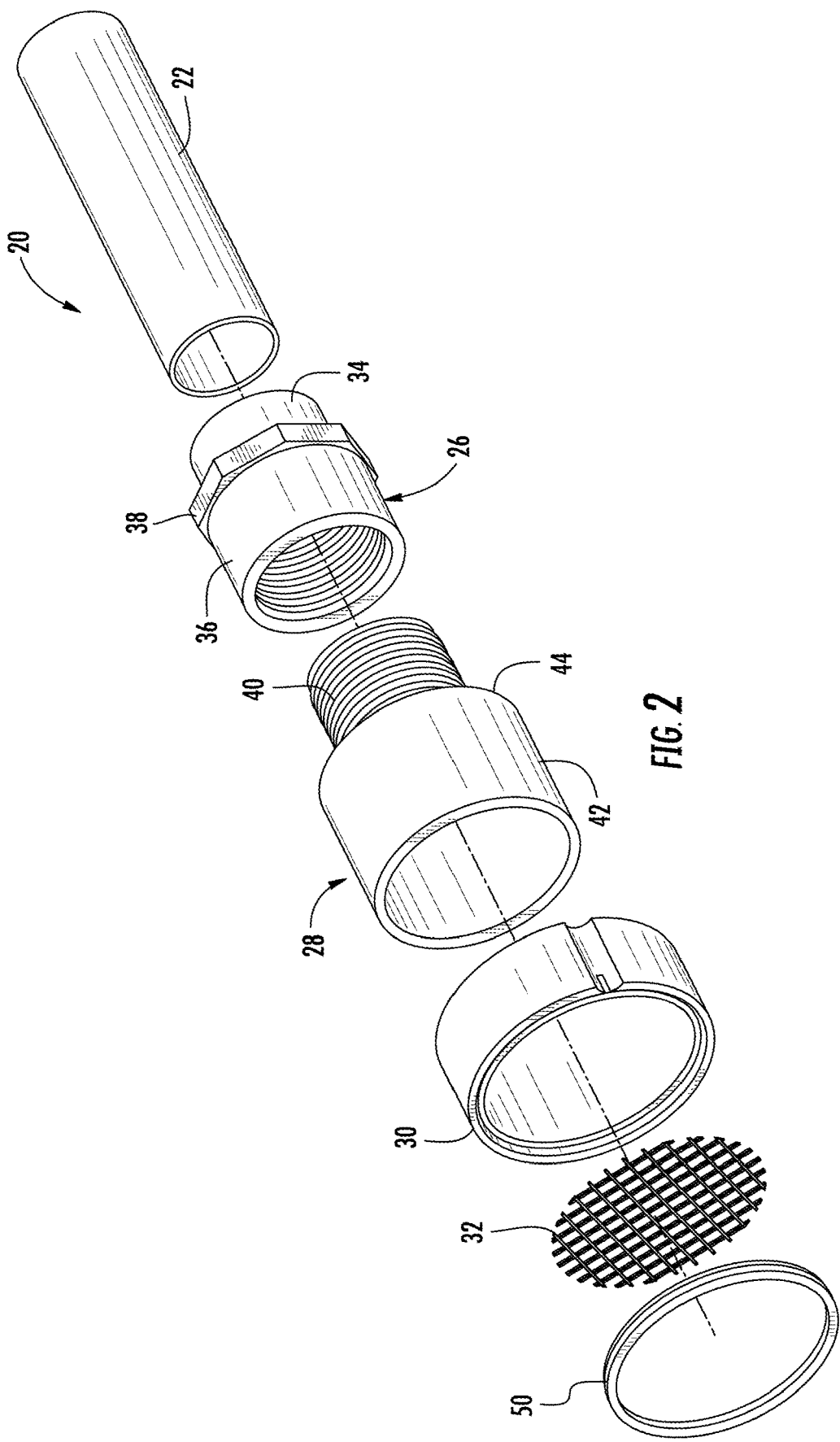
FIG. 2 is an exploded side elevation perspective view of the pipe cap assembly as shown in FIG. 1.
Figure 3:
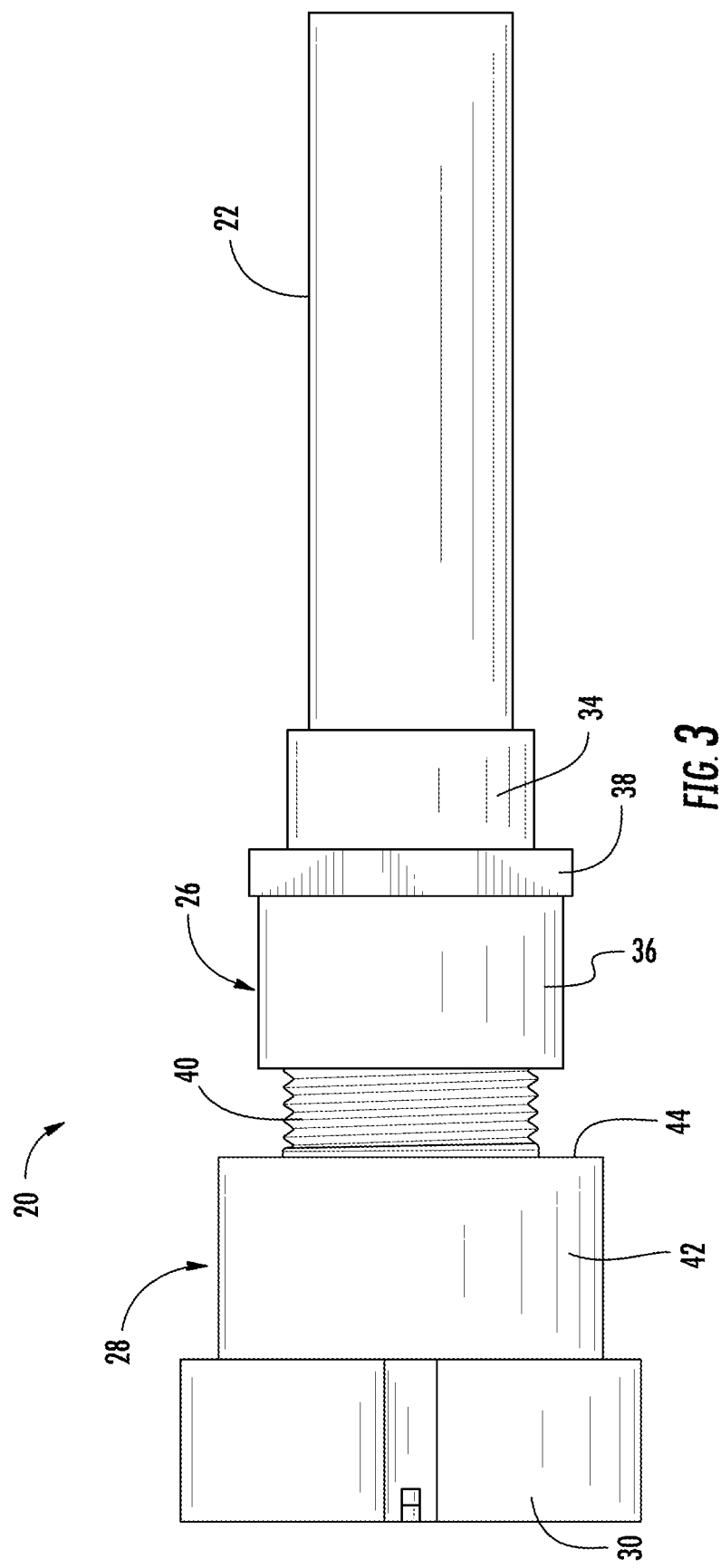
FIG. 3 is a side elevation view of the pipe cap assembly as shown in FIG. 1.
Figure 4:
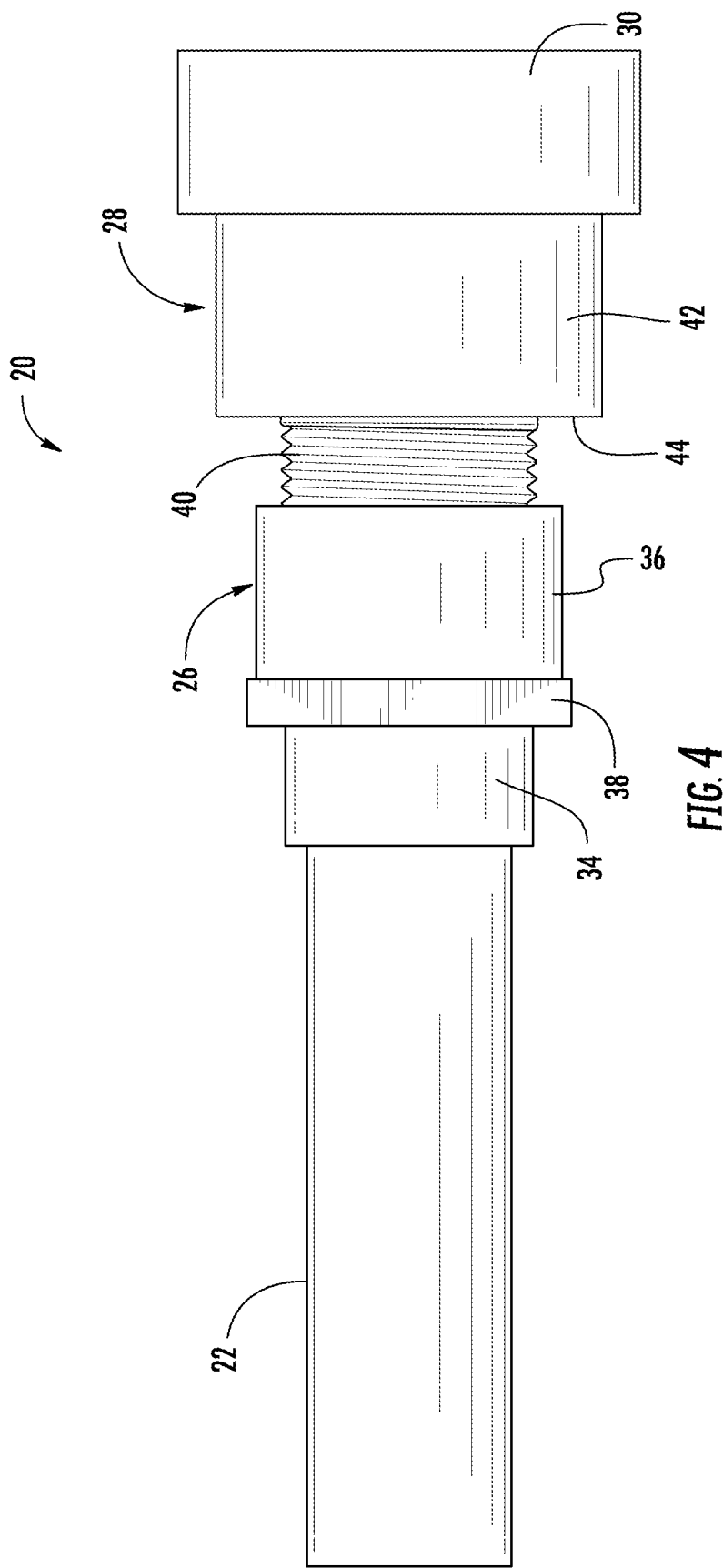
FIG. 4 is a side elevation view of the pipe cap assembly as shown in FIG. 1 with the pipe cap assembly rotated 90 degrees about a longitudinal axis from the position shown in FIG. 3.
Figure 5:
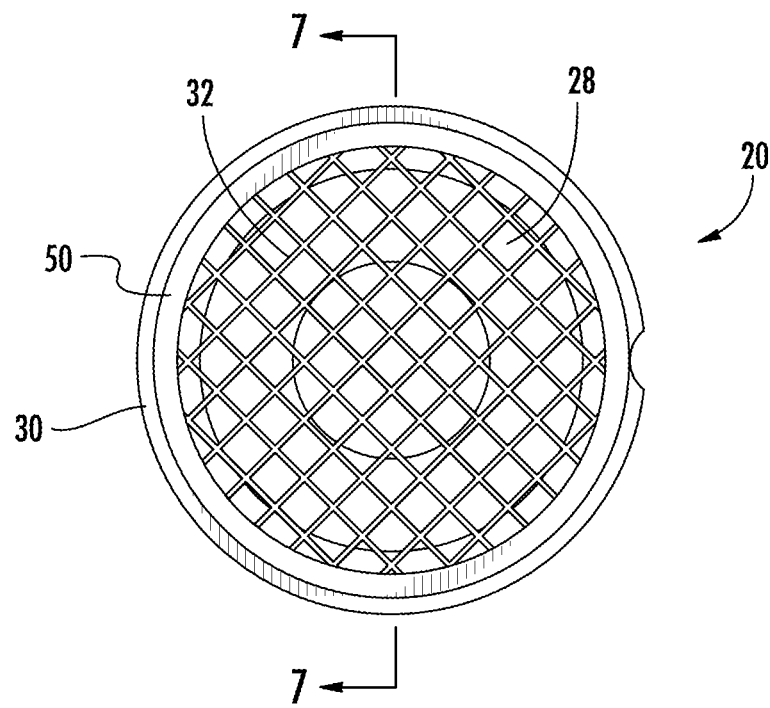
FIG. 5 is a distal end view of the pipe cap assembly as shown in FIG. 1.
Figure 6:
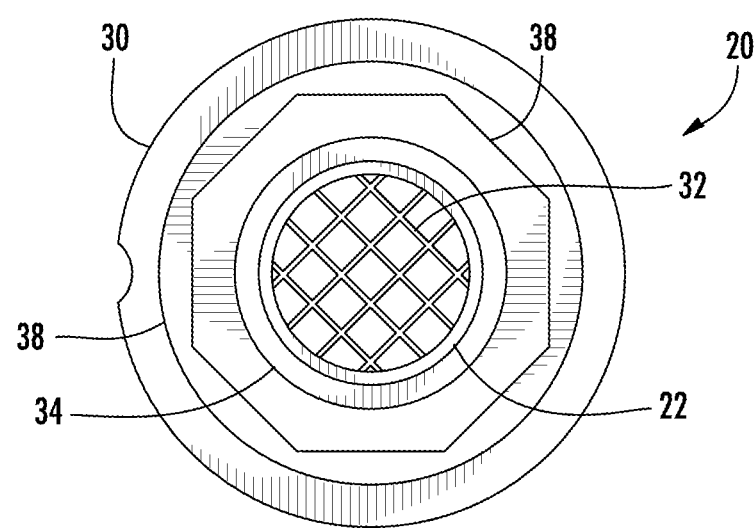
FIG. 6 is a proximal end view of the pipe cap assembly as shown in FIG. 1.
Figure 7:
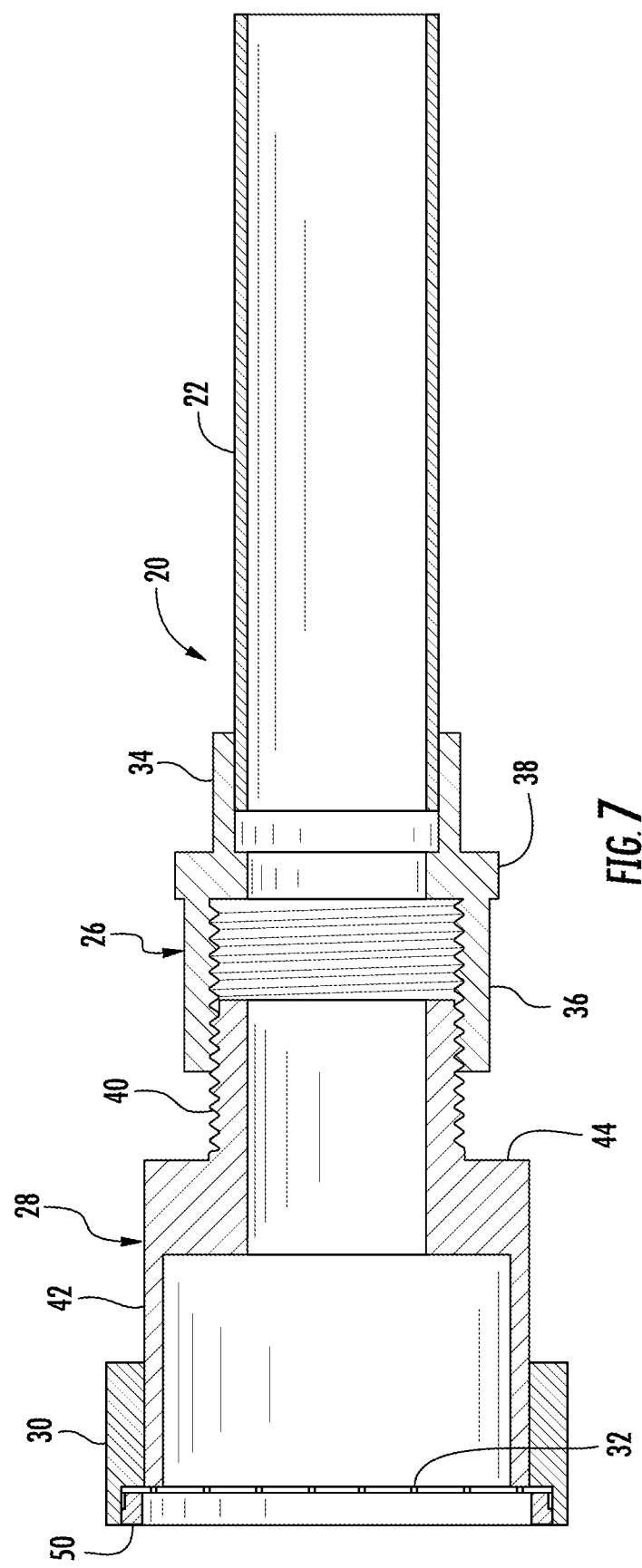
FIG. 7 is a longitudinal cross-section view of the pipe cap assembly as shown in FIG. 1.

Referring now to the drawings, wherein like reference numerals designate corresponding or similar elements throughout the several views, an embodiment of a pipe cap assembly is shown and generally designated at 20. In FIGS. 1 and 3-7, the pipe cap assembly 20 is secured onto an outlet of a drain pipe 22. The drawings show only a portion of the drain pipe 22, which comprises, in this example, conventional cylindrical PVC pipe. The drain pipe 22 shown in the drawings is representative of a drain outlet for a heating and air conditioning system for a building. As will be described below, the pipe cap assembly 20 allows fluid to pass from the drain pipe 22 outlet while restricting bugs and small animals from accessing the end of the drain pipe outlet.

The pipe cap assembly 20 is generally cylindrical along its length and fits concentrically over the end of the drain pipe 22. The pipe cap assembly 20 comprises an inner pipe fitting 26, an outer pipe fitting 28, and a terminal ring cap 30 including a perforated screen 32. The inner pipe fitting 26 is a length of cylindrical pipe having a proximal portion 34 and a distal portion 36. The distal portion 36 of the inner pipe fitting has a larger diameter than the proximal portion 34 of the inner pipe fitting 26. An annular shoulder 38 is thus formed intermediate of the ends of the inner pipe fitting 26. The distal portion 36 of the inner pipe fitting 26 is internally threaded. The inner diameter of the proximal portion 34 of the inner fitting 26 is slightly larger than the outer diameter of the end of the drain pipe 22. This configuration allows the inner pipe fitting 26 to be mounted by slipping directly onto the end of the drain pipe 22.

The outer pipe fitting 28 is a length of cylindrical pipe having a proximal portion 40 and a distal portion 42. The distal portion 42 has a larger diameter than the proximal portion 40 of the outer pipe fitting 28. As with the inner pipe fitting 26, an annular shoulder 44 is thus formed intermediate of the ends of the outer pipe fitting 28. The outer surface of the proximal portion 40 of the outer pipe fitting 28 is externally threaded for threadably securing the outer pipe fitting 28 in the distal end portion 36 of the inner pipe fitting 26 for coupling the outer pipe fitting 28 to the inner pipe fitting 26. Alternatively, the threading may not be used in favor of solvent welding the inner fitting 26 to the outer fitting 28.

The terminal ring cap 30 is a short cylindrical tube. The inner diameter of the ring cap 30 is substantially equal to the outer diameter of the distal portion 42 of the outer pipe fitting 28. This configuration allows the terminal ring cap 30 to be slipped over the distal end 42 of the outer pipe fitting 28. The ring cap 30 is held in place with a frictional interference fit. The slip-on ring cap 30 allows for easy removal for cleaning, repair or replacement.

The screen 32 comprises a perforated cover and spans the ring cap 30 opening. The screen 32 is preferably manufactured from metal wire, which may be steel, such as stainless steel, or aluminum. It is understood that the screen 32 may be any form of material having openings, such as slots, so long as the screen allows fluid to flow and prevents animals from entering the outlet of the drain pipe 22. The screen 32 may sit against a small rim formed in the inner surface of the ring cap 30 adjacent the distal end of the ring cap 30. A disc 50 fits over the periphery of the screen 32 in the ring cap 30 and is secured in place, such as by an adhesive.

In use, the pipe cap assembly 20 is mounted on the outlet end of the drain pipe 22 where fluid exits such that the fluid produced by the heating and air conditioning system may pass through the pipe cap assembly 20, including the screen 32. During connection, the proximal portion 34 of the inner pipe fitting 26 slips over the end of the drain pipe 22. This effectively mounts the pipe cap assembly 20 in the condensate path of the heating and air conditioning system. The configuration of the pipe cap assembly 20 for slip-on attachment provides means for removably securing the pipe cap 20 to a drain pipe 22 outlet adjacent, for example, an exterior wall or foundation of a house. As described above, the inner diameter of the pipe cap assembly 20 increases as the fluid moves toward the screen 32. With the outlet of the drain pipe 22 covered by the pipe cap 20, the expanding inner diameter prevents blockage of the flow of condensate and allows the fluid to run from the outlet of the drain pipe 22 to the ground without risk of clogging. Mounting the pipe cap assembly 20 over the outlet of the drain pipe 22 also provides protection from ingress of bugs and small animals, such as rodents passing the screen 32 and entering the drain pipe 22.

At any time, such as for maintenance, replacement, upgrades, etc., the pipe cap assembly 20 may be detached from the end of the drain pipe 22, as previously described. Allowing the pipe cap assembly 20 to be easily and quickly removed from the drain pipe 22 gives free access to the drain pipe outlet for performing various operations after installation, such as performing repair work, upgrading systems or maintenance of or replacing the drain pipe altogether.

Although the present invention has been shown and described in considerable detail with respect to only a few exemplary embodiments thereof, it should be understood by those skilled in the art that it is not intended to limit the invention to the embodiments since various modifications, omissions and additions may be made to the disclosed embodiments without materially departing from the novel teachings and advantages of the invention, particularly in light of the foregoing teachings. For example, the screen may be formed from any perforated material so long as the openings are sized to pass fluid and prevent entry of vermin.

I claim:

1. An apparatus for restricting access to an above-ground conduit outlet exterior to a building for draining condensate fluid by gravity from a heating and air conditioning system, the conduit outlet having a longitudinal axis, the access restricting apparatus comprising:
    a pipe cap including a hollow elongated body with no holes and having an opening at both a proximal end and a distal end such that a fluid passage extends between the proximal end opening and the distal end opening of the body, the proximal end of the body adapted to be connected in fluid communication with the conduit outlet; and
    a screen forming a mesh grid having apertures, the screen disposed against the opening at the distal end of the pipe cap for enclosing the interior fluid passage of the pipe cap within an enclosed space defined at least partially by the screen,
wherein the apertures in the screen are sized to allow condensate fluid drainage without clogging while restricting access to the conduit outlet of items larger than the apertures including bugs and small animals, and
wherein the pipe cap has an inner diameter, and the inner diameter of the pipe cap expands from the proximal end to the distal end.

2. The access restricting apparatus as recited in claim 1, wherein the proximal end opening is adapted to connect over the conduit outlet.

3. The access restricting apparatus as recited in claim 1, wherein the fluid passage of the pipe cap is coaxial with the longitudinal axis of the conduit outlet to provide a relatively straight fluid passage therebetween.

4. The access restricting apparatus as recited in claim 1, wherein the screen is configured so that the apertures of the mesh grid span the inner diameter of the distal end opening of the pipe cap.

5. A drainage system for a building, the drainage system comprising:
    a heating and air conditioning device including a conduit having an outlet for draining condensate fluid exterior to the building;
    a pipe cap including a hollow elongated body with no holes and open at both a proximal end and a distal end such that a fluid passage extends between the proximal end opening and the distal end opening, the proximal end of the opening adapted to be connected in fluid communication with the conduit outlet; and
    a screen forming a mesh grid, the screen disposed across the opening at the distal end of the pipe cap for enclosing the interior fluid passage of the pipe cap within an enclosed space defined at least partially by the screen,
wherein apertures in the screen are sized to allow condensate fluid drainage while restricting access to the conduit outlet of items larger than the apertures including bugs and small animals, and
wherein the body of the pipe cap has an inner diameter, and the inner diameter increases from the proximal end to the distal end.

6. The drainage system as recited in claim 5, wherein the proximal end opening connects over the conduit outlet.

7. The drainage system as recited in claim 6, wherein the inner diameter of the pipe cap is slightly larger than the outer diameter of the conduit outlet for providing a friction fit.

8. The drainage system as recited in claim 5, wherein the conduit has a longitudinal axis, and wherein the fluid passage of the pipe cap is coaxial with the longitudinal axis of the conduit to provide a relatively straight fluid passage there between.

9. The drainage system as recited in claim 5, wherein the screen is configured so that the apertures of the mesh grid span the inner diameter of the distal end opening of the pipe cap.

* * * * *